United States Patent [19]
Rebbeck

[11] 4,192,083
[45] Mar. 11, 1980

[54] THREE-DIMENSIONAL LAND-USE PLANNING MODEL

[76] Inventor: William G. Rebbeck, 4 Munn Ave., Cherry Hill, N.J. 08034

[21] Appl. No.: 851,501

[22] Filed: Nov. 14, 1977

[51] Int. Cl.² .............................................. G09B 29/02
[52] U.S. Cl. ......................................... 35/16; 35/41; 108/64
[58] Field of Search ................... 35/7 R, 7 A, 16, 41; 108/64

[56] References Cited

U.S. PATENT DOCUMENTS

| | | | |
|---|---|---|---|
| 1,060,430 | 4/1913 | Crecelius | 108/64 |
| 1,713,225 | 5/1929 | Haase | 108/64 |
| 2,127,546 | 8/1938 | Whittier | 35/41 |
| 2,871,619 | 2/1959 | Walters | 35/16 X |

*Primary Examiner*—Harland S. Skogquist
*Attorney, Agent, or Firm*—Morton C. Jacobs

[57] ABSTRACT

A three-dimensional land-use model is constructed in modular units and used with a modular framework so that it can be readily modified and changed as a community develops and expands.

6 Claims, 8 Drawing Figures

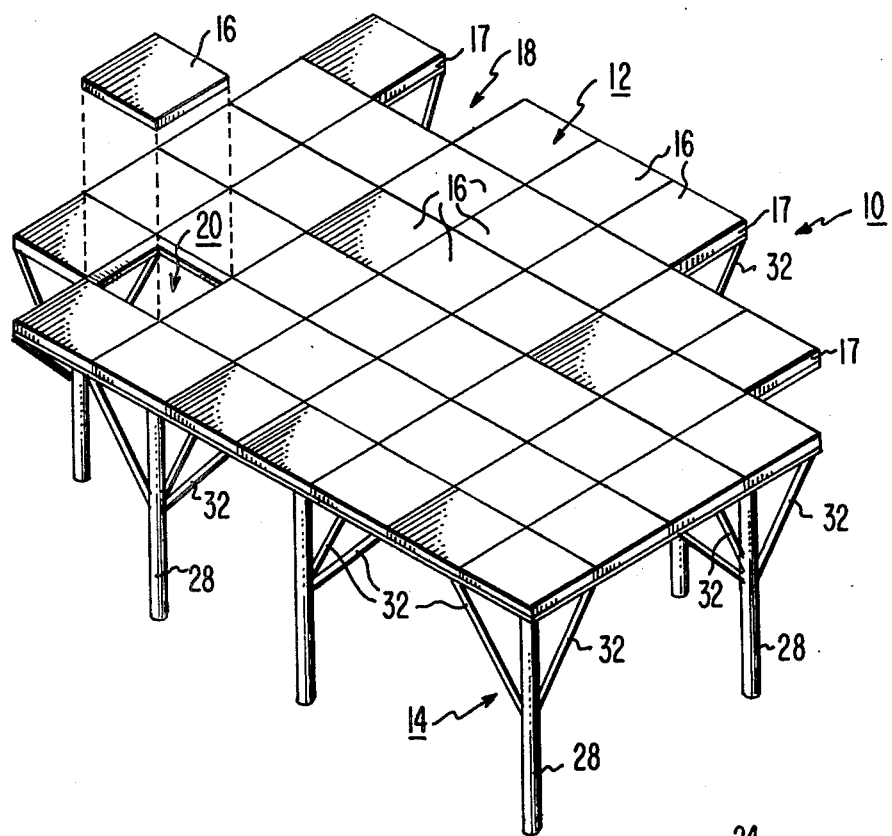
Fig.1
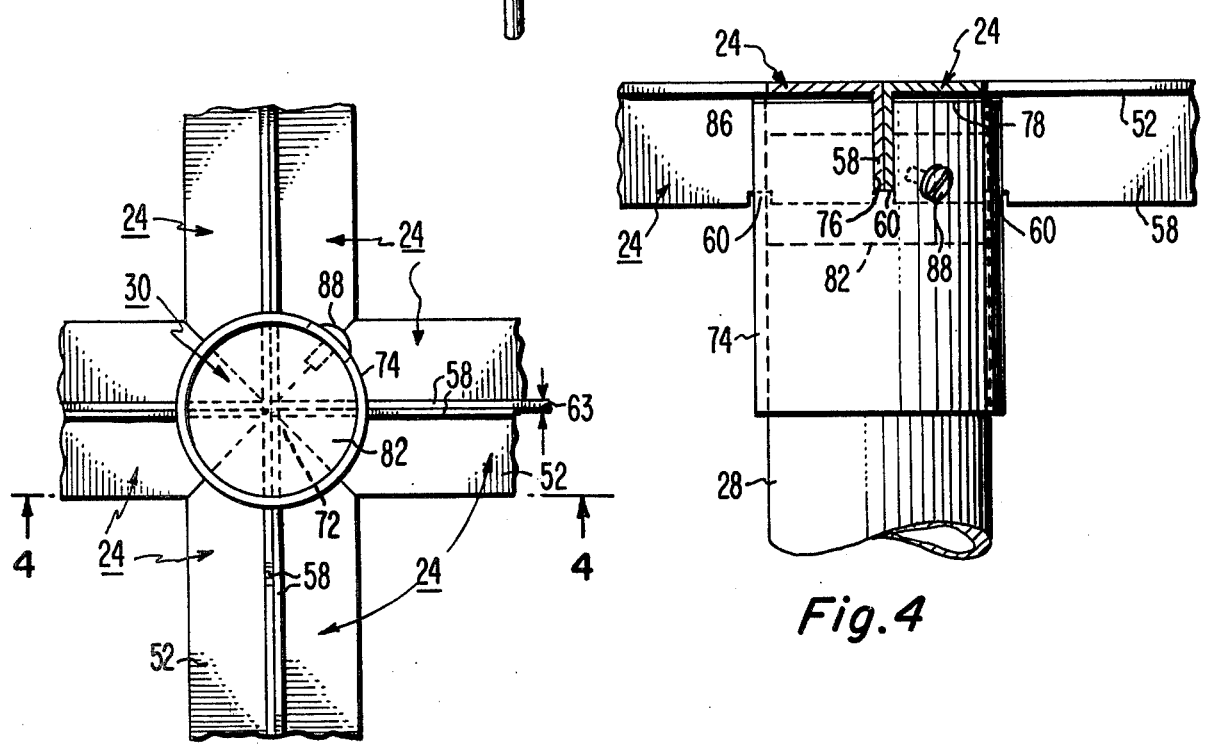
Fig.3
Fig.4

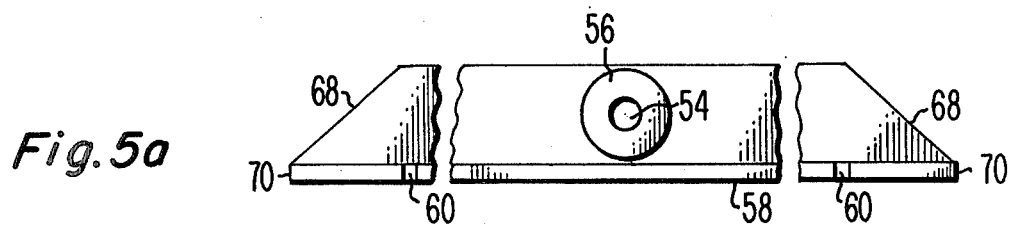
Fig.5a
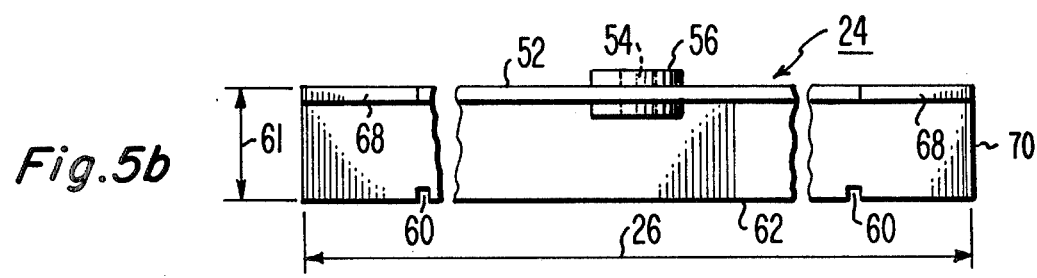
Fig.5b
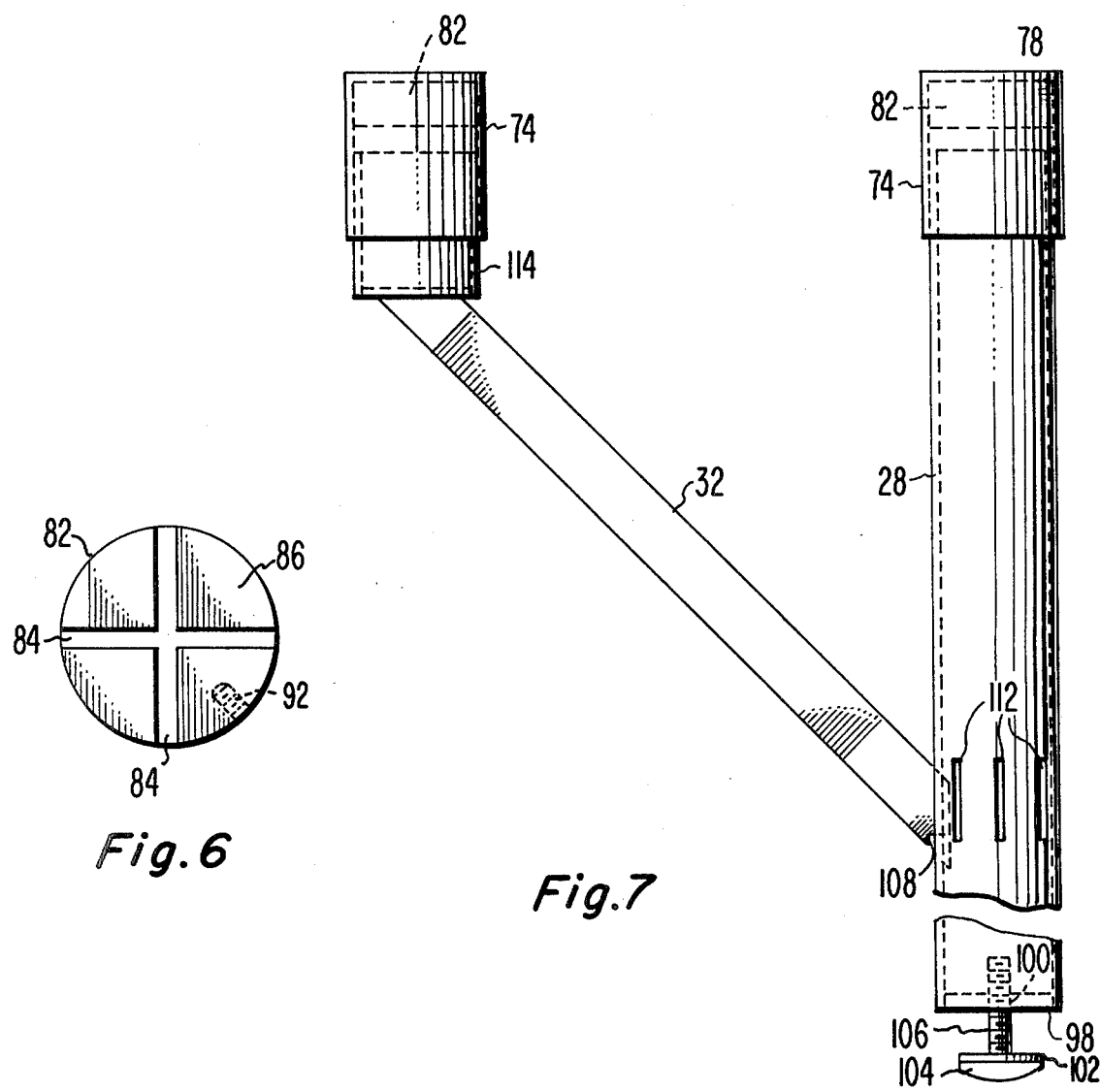
Fig.6
Fig.7

THREE-DIMENSIONAL LAND-USE PLANNING MODEL

BACKGROUND OF THE INVENTION

This invention relates to land-use display models for community planning and particularly to three-dimensional models. Federal, state and local governments are interested in orderly development of undeveloped communities. Activities necessary to create comprehensive community development plans and to develop a policy-planning management capacity within communities are encouraged by federal and state agencies. Early determination of community needs, long-term goals and short-term objectives, and establishment of effective programs to meet these objectives and goals are deemed to be necessary steps if economic and human resources are to be effectively applied and served.

Three-dimensional scale models of entire communities or segments thereof have considerable value in land-use and community planning both for visualizing present and prospective conditions of land usage and for communicating objectives for furture usage to decision-making authority and to the public. However, presently available three-dimensional models representing extended areas, when prepared to a scale having more than ornamental utility, are large, cumbersome and costly as well as inconvenient to produce, repair and update. Installation and relocation costs are high also.

What is needed for community development and land-use planning is a model which has a low original investment cost and is easily and economically repaired, updated, revised, expanded and contracted. It should be easily installed and relocated and adaptable for promotional efforts related to localized projects within the larger community as well as for overall planning. Desirable features are that the model be fabricated to utilitarian vertical and horizontal scales showing topographical elevations of the land surface, waterways, foliage as well as man-made features such as residences, industrial, commercial and public buildings, roads, utility installations and bus routes. It should preferably be joinable to models of similar scale of adjacent communities and land tracts without overlap or irregular gaps. It should be displayable in a horizontal or vertical plane and at intermediate sloping angles.

SUMMARY OF THE INVENTION

It is among the objects of this invention to provide a new and improved land-use and planning model and support structure.

It is among the objects of this invention to provide accurately scaled three-dimensional land-use planning models which are low in fabrication cost and easily assembled, installed, removed and relocated.

Another objective is to produce models and support structures whose size is readily enlarged or contracted to meet the changing needs of the community planners.

In a particular embodiment of this invention, the land-use planning model is fabricated of a plurality of square modular sections of foamed plastic, each module three-dimensionally contoured to scale on its upper surface to represent the land topography. Modules are scaled so that one side represents a certain horizontal land distance (e.g., one-half mile) and sufficient modules are placed edge to edge extending laterally in four directions as required to create a scale model of any land area regardless of its shape.

The upper module surface is contoured in certain elevational intervals (e.g., five-foot) and is multicolored in accordance with a plan to represent different land usages and waterways. Significant foliage, buildings, housing and structures rise above the surface contours in accordance with a simplified scale which provides realistic representation of great multitude of such objects at very low cost. Roads, streets, lots, communities, identified by name, property lines and political boundary lines appear on the surface to scale and with photographic accuracy.

A metal framework holds the modules in proper relationship, one to the other; the framework is assembled from standardized elements simple interconnected and at any time is enlargeable (or reducible) in any horizontal land direction to exactly match the configuration and number of modules of the model. The framework is used with legs to create a table for floor display of the model or in another embodiment the framework can be vertically wall-mounted. Intermediae angle positioning is also possible for viewing the model.

Each module rests on the horizontal surface of four angle strips, one strip along each side of the module. Pins projecting from the underside of the module index in holes in the angle strips giving precise positioning of the module on the framework. A positive relationship between modules is established by interlocking of angle strips to a common collar connector at the intersection where two, three or four modules meet.

For repair or updating of the model, individual modules are lifted from the model without disrupting the remainder, and sent to the model shop. When the model is to be enlarged, module-sized additions are made to the metal framework and the new modules are set in place. Conversely, the area encompassed by the model is reduced by removing modules and their module-sized supporting framework.

Standardized removable legs, to provide a model at table height, cooperate with the interlocking collar device used at corners where modules meet.

BRIEF DESCRIPTION OF THE DRAWING

The foregoing and other objects of this invention, the various features thereof, as well as the invention itself, will be more fully understood from the following description, when read together with the accompanying drawing in which:

FIG. 1 is a perspective view of a modular land-use model and framework therefor embodying this invention.

FIG. 3 is a bottom plan of the underside of an intersection of the framework of FIG. 2.

FIG. 4 is a side elevation of the intersection of FIG. 3, partly in section.

FIGS. 5a and 5b are respective bottom and side elevation views of an angle member used in the framework of FIG. 2.

FIG. 6 is a top view of a retainer disk used in assembling the framework intersection of FIG. 4.

FIG. 7 is a side elevation of a portion of the framework of FIG. 1.

In the drawing corresponding parts are referenced throughout by similar numerals.

DESCRIPTION OF A PREFERRED EMBODIMENT

Figure 2:
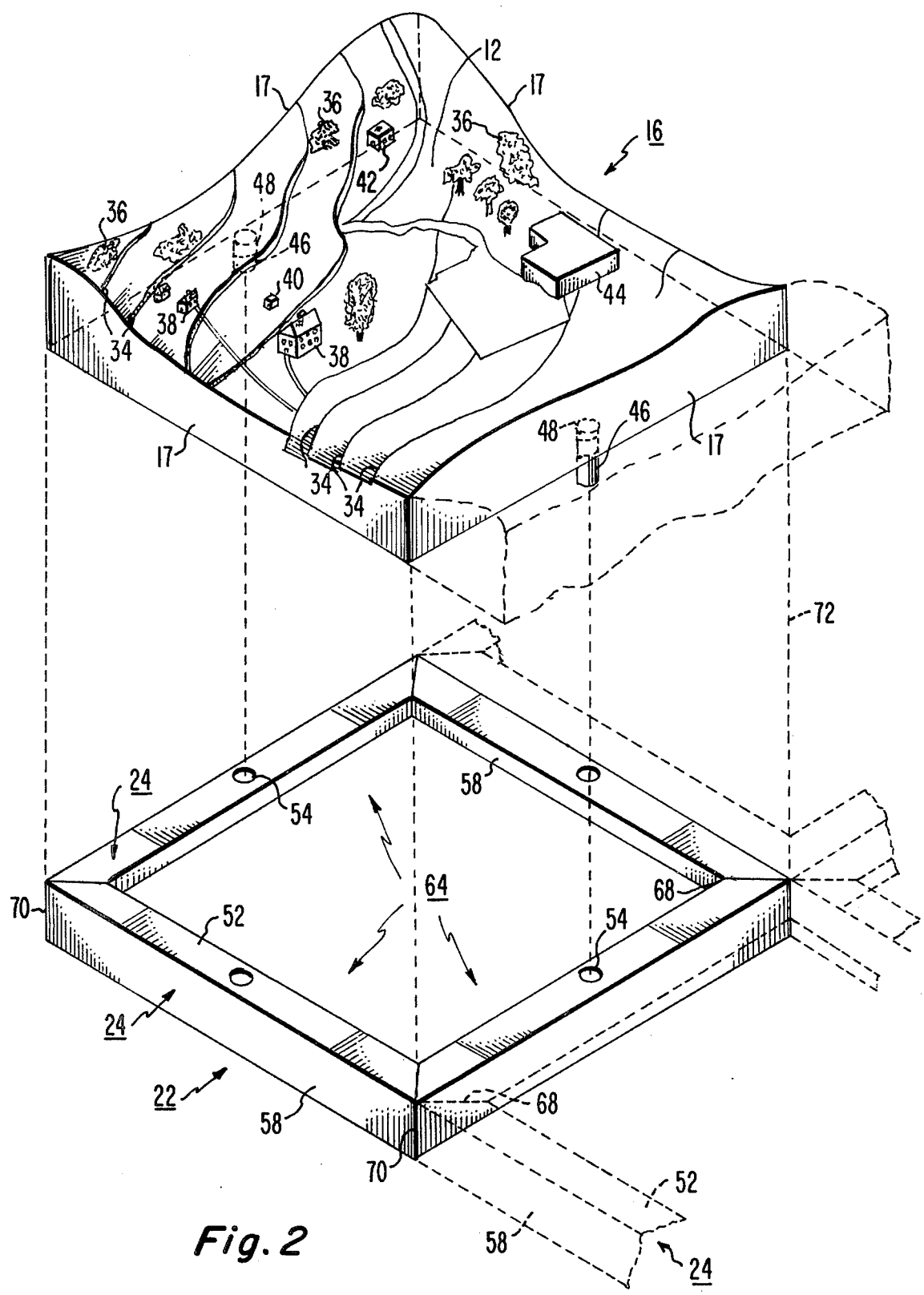
FIG. 2 is an exploded perspective view of a module and a portion of the framework for the embodiment of FIG. 1.

In an embodiment of this invention FIGS. 1-7 a land-use model assembly 10 is comprised of a three-dimensional surface 12 mounted on a metal structure 14. The three-dimensional surface 12, formed by removal of material from the upper surface of generally rectangular modules 16 of lightweight foamed plastic, is contoured to represent the land topography of the modeled area. Other features of the land area, e.g., buildings, foliage, type of usage, are represented on the surface 12 by application of add-on pieces, symbols, color codes and lines as more fully explained hereinafter.

The modeled surface area is composed of a plurality of modules 16 of equal length and width (and having a contoured top surface 12) placed generally side surface 17 to side surface 17 with edges aligned in checkerboard fashion and extending in each direction as required to include the entire modeled land area. Modules are omitted along the edges 18 (FIG. 1) and even at the center 20 of the model when the regions which would otherwise be represented are of no current interest to the land planners or developers. Modules 16 may be added and the model 10 may be expanded at any time.

The foamed plastic modules 16 rest (FIG. 2) upon a metal structure 22 fabricated of a plurality of short, identical, interchangeable angle sections 24 which have a length 26 equal to a module side. The structure is expandable or reducible in any amount by the addition or removal of angle sections 24; such adjustments can accommodate a change of even a single module 16. Thus, the structure 22 may always be exactly matched to the modeled land area.

Legs 28 located at spaced intervals support the model-bearing structure 22 and attach to the structure 22 at the junction 30 of angle sections 24. Struts 32 extend from the legs 28 to support other proximal junctions 30 not directly supported by a leg 28 (FIGS. 1, 3, 4, 7).

The supporting structure 22 is composed of a plurality of identical angle sections 24 having a length 26 along the bent edge equal to the length of one module side 17, i.e., 13.2 inches in one illustrative scale. One surface 52 of the angle has (FIGS. 5a, b) a beveled (i.e., cut back) edge 68 at both ends at an approximately 45° angle from the bond line. A hole 54 fitted with a flexible grommet 56, e.g., rubber, is located at the center of the cut-back angle surface 52; the hole in the grommet 56 provides a friction fit for a one-quarter inch pin. The other angle surface 58, at right angles to the cut-back surface 52, has two square notches 60 cut from its edge 62, one near either end for use in interconnecting with adjacent modules.

A pair of rigid (wooden or metal) pins 46 (e.g., approximately one-quarter inch in diameter and three-quarters of an inch long) used to position the module 16 on the mounting structure 22 are inserted and bonded with adhesive in circular recesses 48 provided in the flat bottom surface of the module 16. These recesses 48 (e.g., approximately one-quarter inch deep) are centered between the module sides 17 and near opposite edges of the module 16 and are set back from the edges of the module at positions corresponding to those of the holes 54.

To erect a basic structural unit 64 (i.e., structure suitable to mount a single module 16 for horizontal display) four angle sections 24 are positioned to form a square with the cut-back surfaces 52 of the angles located at the top and horizontal and extending into the junction 30 and toward the opposing angle 24. The beveled edges 68 of one angle section 24 locate in contact with the beveled edges 68 of adjacent sections 24 to form a mitre joint and the vertical edges 70 of adjacent sections 24 contact vertical edges 70. When the foamed plastic module 16 is centered, with side surfaces 17 of the module and vertical surface 58 of the structural angle section 24 in alignment, the pins 46 projecting from the underside of the module 16 slide into the grommet 56 in the horizontal surface 52 of the angle section 24 and are frictionally retained. The outside vertical surfaces 58 of the angle sections 24 are substantially co-planar with the vertical side surfaces 17 of the foamed plastic module 16. There are substantially no gaps between adjacent modules 16, the contours of one module mate with those of adjacent modules, and a continuous three-dimensional surface 12 is produced on the model. Additionally, there is no interference or interlocking between adjacent modules 16; a module 16 anywhere on the entire surface 12 may be lifted vertically and removed from the support structure 22 without any need for moving or removing the adjacent modules 16.

To form an entire structural assembly 22, basic structural units 64 comprising four angle sections 24 are added, one basic unit 64 for each added module 16, with vertical and horizontal surfaces 58 and 52 of one angle section 24 in continuous and coextensive contact with the corresponding surface 58 and 52 of the adjacent unit 64. Thus, at the junction 30 formed by the intersection of four basic structural units 64, eight angle sections 24 meet along a common line 72 (FIGS. 2 and 3).

A collar 74 (FIG. 3) consisting of a short metal tube (e.g., aluminum 1½ inch inside diameter, 2½ inches long) and having four equispaced longitudinal slots 76 cut in from one end is used to hold two to four basic structural units 64 together at an intersection 30. The collar 74 with slots 76 opening upward is centered below the intersection of eight angle sections 24 and pressed onto the intersecting sections 24 with a pair of adjacent vertical legs 58 of angle sections 24 entering each of the four slots 76. Each slot 76 provides a press fit for two adjacent angle legs 58 and is sufficiently long to bring the upper edge 78 of the collar 74 approximately into contact with the underside of the horizontal surface 52 on the angle section 24. In this position, the notches 60 in the angle sections 24 engage and interlock with the lower edge of the slots 76 in the collar 74. This engagement of angle section notches 60 with collar slots 76 prevents lateral separation of the basic structural units 64 and assures a permanently fixed relationship between adjacent modules 16, (FIG. 4).

A cylindrical disk 82 (FIG. 6), e.g., aluminum, has two transverse grooves 84 cut into and across one flat surface 86 and passing through the center of the disk 82. The width of the grooves 84 is sufficient to receive two adjacently placed angle legs 58. The disk 82, inserted with grooves 84 upward into the connecting collar 74, (FIGS. 3, 4) fully embraces the angle sections 24 in the grooves 84. A set screw 88 passing through a slot 90 in the wall of the connecting collar 74 engages a threaded hole 92 in the curved surface of the disk and holds the disk 82 in place. The disk 82 functions to maintain angle sections 24 at right angles in the intersection 30 and also prevents sagging of angle sections 24 by assuring a common line 72 of butting contact between edges 70 of angle sections 24.

In model configurations where less than four modules 16 meet at an intersection, spacers (not shown) are used to assure proper fit without looseness of the vertical legs 58 of sections 24 in the slots 76 of collar 74 and slots 84 of retainer disk 82. The spacer is a flat or bent rectangle of metal having a thickness equal to the angle section thickness 63 and a height approximating the leg height 61 (FIG. 5b). Where only two modules 16 meet at an intersection, as along the side of the model, a flat spacer bridging the intersection is spaced alongside the vertical angle section surfaces 58. The added thickness provided by the spacer provides the same tight fit of collar connector 74 and retainer disk 82 as though six rather than four angle sections 24 were meeting. Similarly, where three basic structural units 64 meet at an intersection as at an indent in an edge of the model (e.g., at space 18 in FIG. 1) a spacer bent at right angles provides two vertical legs for the missing modular frame. Where two basic structural units 64 meet corner-to-corner at an intersection, two bent spacers supply the vertical legs for the two missing frames 66 and assure tightness of collar connector 74 and retainer disk 82.

A plurality of cylindrical tubular legs 28, e.g., aluminum tubes, telescope into the connecting collars 74 from below butting against the retainer disk 82. The legs 28 are of standardized length to position the land-use model surface 12 at a convenient table height for viewing, i.e., approximately 28 inches high. The lower ends of the legs 28 are closed with a cap 98 having a central threaded hole 100 to engage a level adjuster 102 comprised of a circular rubber pad 104 attached to the flat head of a bolt 106. Legs 28 are installed at intersections 30 with a spacing of two-to-three modules 16 between them. Compensation is made for irregularities in the floor surface by turning the level adjuster bolts 106 until the upper plane of the structure 14 is level and all legs 28 are firmly seated both on the floor and also against the retainer disks 82.

Intersections not supported by a leg 28 directly beneath can be supported by diagonally-oriented struts 32 which extend from legs 28 at adjacent intersections. The struts 32 are generally flat strips of metal having notch 108 on the lower edge near the lower end 110 to engage the lower edge of one of eight equipaced longitudinal slots 112 in the tubular leg 28. The slots 112 are located approximately midway between the leg ends. The other end of the strut 32 attaches to the base of a short cylinder 114 which telescopes from below into the connector collar 74 at the intersection 30 to be supported. Struts 32 are provided, for example, in two standard lengths, such that support can be provided from a leg to an intersection 30 separated by a distance of one module 16 or support can be provided to an intersection 30 located diagonally across a module.

Thus, a modular framework is assembled to conform to the desired shape (regular or irregular) of the model as shown in FIG. 1. The framework can be extended as the model grows in size as when the development of a community changes. Each time one or more modules are added to the model, the corresponding structural units 64 are readily added to the framework. Use of standardized angle sections 24 and standardized legs 28 provides for economical and simple fabrication and assembly of the structural framework.

Modules 16 are fabricated to a lateral scale; one useful scale is one inch equals 200 feet and the modules are 13.2 inches long on a side 17 equivalent to one-half mile of land distance. Thickness of the module 16 prior to contouring is based on the range of elevations across the modeled surface as determined from U.S. Geological Survey maps and aerial photometric data. A suitable vertical scale is one inch to 100 feet and land contours 34 represent each five foot change of elevation. Contours 34 are cut into the plastic foam block (e.g., eight-pound polystyrene foam) working down from the highest contour using a tape-controlled or manual pantograph-controlled milling machine.

Where wide elevational differences exist across the model surface, e.g., a mountain rising over a valley, a box-frame, solid block, (e.g., of plastic) or stand-off legs, preferably of adjustable length, are attached to the underside of the contoured module 16 as spaces (not shown) to provide vertical alignment of adjacent modules 16 across an entire three-dimensional surface 12. The spacers project a pair of pins, similar to the pins 46 described above, suitably located and sized to engage the flexible grommets 56 incorporated in the horizontal surface 52 of the angle sections 24 and to provide fastening of the module 16 to the framework structure 14. Likewise, such spacers have grommeted openings at corresponding locations to receive the module pins 46 so that the modules can be secured thereto. However, many other methods to prepare scaled three-dimensional contour representations of land areas are known to the trade and the model assembly of this invention is not to be considered as limited to the method of producing contoured surfaces described above nor is the described method claimed as a novel part of this invention.

After cutting, the contoured upper surface 12 is covered with a primer (not shown) and painted in appropriate colors to represent such parameters as land use or soil type. Varying hues of green are generally used for soil type identification; water areas are generally blue in varying shades according to depth. Property lines and political boundaries can be added. Roads, streets, railroads, etc. are transferred to the module surface 12 from similar sources and by similar photographic techniques. Roads can be colored in varying shades of gray to indicate traffic density and a variety of colors may be used to indicate zoning regulations affecting land areas.

Major areas of foliage are represented on the module, for instance, by small pieces of colored lichen 36 glued to the surface 12 in locations in accordance with aerial photographs. Small rectangular molded parts are glued to the surface to represent houses. Pieces 38 representing unattached private homes are provided in suitable standard sizes, such as large and small. A detached garage may be represented by a smaller piece 40. Other standardized pieces (not shown) are used for semi-attached and row homes. Commercial buildings 42, schools 44, factories, municipal buildings, apartments, bridges (not shown) etc., are custom-built for each model using conventional model-making materials, e.g., balsa wood, and methods and glued in place. Modeled buildings generally are dimensioned vertically to the nearest ten feet of height. In an alternative embodiment a vertical scale larger than the above-mentioned "1 inch equals 100 feet" scale, e.g., 1 inch equals 50 feet, may be used to "amplify" the height of nonresidential structures for emphasis in land-planning models.

For wall-mounting of the model a lattice framework (not shown) identical in shape to the model structure and having receptacles located to receive the extended end of the collar connector 74 may be mounted on the wall. The collars 74 protruding from the back of the model structure telescope with the receptacles of the mounting structure to provide vertical support for the model. To mount the model at an angle from the floor the length of the legs is increased progressively from the near end to the far end of the model.

Accordingly, a new and improved land-use and planning model and support structure is provided by this invention, which can be scaled accurately, and which can be readily modified to meet changing needs of community planners. Various modifications of this invention will be apparent to those skilled in the art within the scope of the appended claims.

What is claimed is:

1. A three-dimensional land-use display model and support comprising:
    a plurality of rectangular modules having various three-dimensional surfaces representative of a contoured land surface;
    a framework for supporting said modules, said framework including means for removably and individually connecting said modules in assembled relation with aligned and contiguous corners and edges,
    said framework comprising a plurality of modular structural units each providing a horizontal planar surface to support one of said modules incorporated into said display model, said module connecting means including means for connecting each of said units to contiguous units whereby said framework is incrementally expandable;
    each of said modules including a horizontal planar undersurface, and said structural units including coextensive planar surfaces for supporting said module horizontal surfaces in a common plane; the vertical edges of each of said modules being planar and coextensive with said supporting structural unit so that contiguous positioning of said modules and associated support structural units provides a continuous similated contoured land surface without interstitial gaps, and individual modules are attached and removed without dislocation of adjacent modules;
    each of said modular structural units comprising an open rectangular frame supporting the associated one of said rectangular modules at the outer edges thereof;
    whereby a continuous land-use display model is formed by the assembled modules.

2. A land-use display model and support as recited in claim 1 wherein said means for connecting said structural units includes means for connecting four of said open frames at contiguous corners thereof.

3. A land-use display model as recited in claim 1 wherein each of said rectangular frames includes four similar standardized members forming a horizontal planar surface.

4. A land-use display model as recited in claim 3 wherein said standardized frame members are angle members each having one leg horizontal producing said horizotal planar surface and one leg vertical on the periphery of said rectangular frame engaging said common connector, each of said rectangular modules including means on the undersurface thereof for interengaging said horizontal planar surfaces of said angle members.

5. A land-use display model and support as recited in claim 4 wherein said means for connecting four of said open frames includes a circular tube segment having four equispaced longitudinal slots in one edge receiving and engaging the ends of said vertical angle legs, whereby as many as four modules and associated support are joined with aligned corners and edges.

6. A land-use display model and support as recited in claim 5 and further comprising a plurality of tubular legs of extended length, each of said legs telescoping from beneath and with one of said common connectors, whereby said land-use display model is elevated above floor level for viewing ease.

* * * * *